Nov. 12, 1968   D. J. HARDY ET AL   3,410,241
AIR CUSHION VEHICLES PROVIDED WITH FLEXIBLE SKIRTS
HAVING SUCTION REDUCING MEANS
Filed Oct. 7, 1965   9 Sheets-Sheet 6

United States Patent Office 3,410,241
Patented Nov. 12, 1968

3,410,241
AIR CUSHION VEHICLES PROVIDED WITH FLEXIBLE SKIRTS HAVING SUCTION REDUCING MEANS
Derek James Hardy, Cowes, Isle of Wight, and Lavis Albert Henry Riddle, East Cowes, Isle of Wight, England, assignors to Westland Aircraft Limited, Yeovil, Somerset, England
Filed Oct. 7, 1965, Ser. No. 493,650
Claims priority, application Great Britain, Oct. 28, 1964, 44,006/64
10 Claims. (Cl. 114—67)

ABSTRACT OF THE DISCLOSURE

An air cushion vehicle is provided with air holes formed in an outer flexible skirt wall for reducing suction. Water-deflecting strips arranged on the outer wall serve as guides for streams of air issuing outwardly from the air holes.

---

This invention relates to air cushion vehicles having flexible skirts and has especial, but not exclusive, reference to an air cushion vehicle having a flexible skirting arrangement comprising an outer wall and an inner wall constituting an air supply duct serving nozzles forming peripheral jets, and the invention will be described in connection with such vehicles.

A disadvantage of air cushion vehicles is a characteristic known as "ploughing in," and from present day knowledge it appears that this occurs at high speed over water, where the dynamic head of the water is considerably greater than either the plenum pressure in the skirt or the cushion pressure behind it. This may lead to a local deflection of the skirt, particularly near the bow of the vehicle, and this not only causes drag, but also induces suction forces that pull the vehicle further into the water. It is an object of the invention to provide means whereby this ploughing in is lessened or obviated.

According to one aspect of the invention an air cushion vehicle has a flexible skirting arrangement wherein there are provided on the skirt projecting water-deflecting strips aligned relatively to the direction of flow of the water impinging on them.

The strips may be rubbing strips arranged to serve as guides for air derived from the skirt and issuing from air holes formed in the skirt wall between the rubbing strips. They may be located around the bow of the vehicle, and disposed in substantially radial alignment therearound.

According to another aspect of the invention, there may be provided around the bow downwardly and rearwardly directed anti-suction spray suppression jets located above the lower edge of the skirt. These jets may be supplied with pressure air derived either from the air supply for the skirting arrangement, or from an independent source. Preferably each jet is disposed between two water-deflecting strips.

According to a further aspect of the invention, the skirting arrangement may comprise an inner skirt wall and an outer skirt wall formed with said air holes or jets, parts of the lower margin of the outer skirt wall being arranged to be hingeable about horizontal axes, the air holes or jets being arranged to be closed when the skirt is out of the water and the lower margin is hinged downwardly, and to be opened when the lower margin is hinged upwardly due to contact with the water.

The strips may be planing devices located around the bow and inclined forwardly and upwardly at an angle of about 40° to the horizontal. Alternatively or in addition, there may be planing devices located along the sides of the vehicles and aligned to the direction of motion of the vehicle. A planing device may be mounted on an inflatable member deriving air pressure from the air supply for the skirting arrangement, or mounted on a closed inflatable flexible tubular member set in wall of the skirting arrangement. It may be so located as to be partly below the lower edge of the skirting arrangement.

According to yet another aspect of the invention, the strips may be flow breaker strips located on the bow and disposed normal to the flow of water thereagainst. Alternatively they may be located around the sides of the bow and inclined forwardly and outwardly at about 40° to the vertical, and normal to the flow of water thereagainst.

Embodiments of the invention will be described with reference to the accompanying drawings, in which:

FIGURE 1 is a fragmentary diagrammatic view of part of the bow of an air cushion vehicle according to the invention, showing the approximate flow of water when the vehicle has a tendency to plough in, FIGURE 20 is a fragmentary view of the strip on a larger scale, and, FIGURES 21 and 22 are views similar to FIGURE 20 but of alternative constructions.

Figure 1:
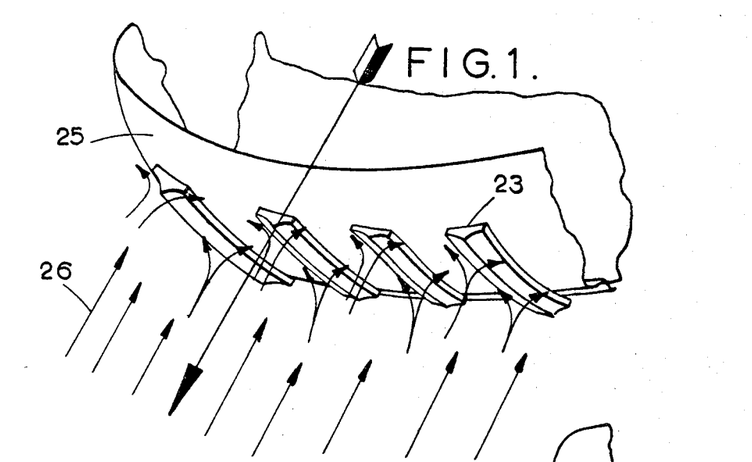
Figure 2:
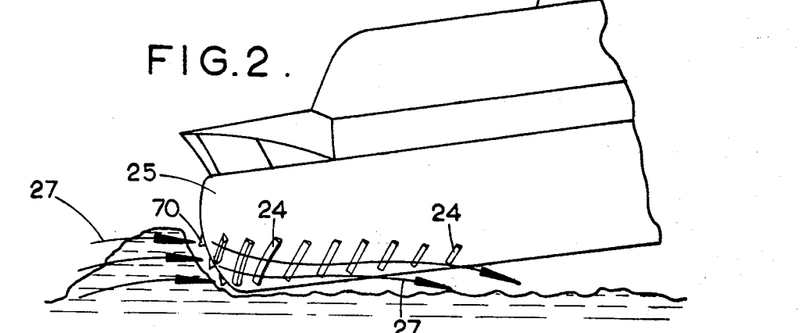
FIGURE 2 is a fragmentary diagrammatic side elevation of another embodiment of air cushion vehicle sharing the approximate flow of water.

It will be convenient first to refer to FIGURES 1 and 2 of the drawings, for a brief preliminary consideration of the problem with which the invention is concerned. In both of these figures there is indicated an air cushion vehicle experiencing "plough in." The conditions are, of course, shown purely diagrammatically.

The effect of "plough in" is to cause the vehicle to dip forwardly, so inducing increased drag and the occurrence of suction forces tending to aggravate the condition by pulling the vehicle further into the water. The invention is concerned with the provision of water-deflecting strips such as 23 or 24 on the skirt 25 of the vehicle. The direction of the flow of the water is indicated very approximately by arrows 26 and 27 in the two figures. It will be appreciated that the flow will depend, inter alia, on the pattern of the water-deflecting strips, and two quite different patterns are exemplified in FIGURES 1 and 2. The effect aimed at, however, is so to deflect the water as to urge the skirt out of the water, thus minimizing drag. In addition, as will be described hereinafter, air may be bled from the skirt and discharged through holes or jets (not shown in FIGURES 1 and 2) for air lubrication purposes.

Referring to FIGURES 3 to 11, in one embodiment of the invention an air cushion vehicle has a bow 28 of generally semi-circular plan configuration. Below the platform 29 of the vehicle there is a flexible skirting arrangement consisting of an outer flexible skirt 30 and an inner flexible skirt 31 spaced apart by a considerable distance at their lines of junction 33, 34 respectively with the platform 29 but close together at their lower edges 35, 36, which are themselves spaced apart by diaphragms 37, the conformation and/or other suitable tension members of the skirting arrangement being such that pressure air supplied to the skirting arrangement through ducts (not shown) in the platform 29 causes the outer and inner flexible skirts 30, 31 to balloon away from one another, thus forming the equivalent of a plenum chamber, while the lower edges 35, 36 of the skirts and the diaphragms 37 spacing them apart provide inwardly directed peripheral jets indicated at 38.

Figure 3:
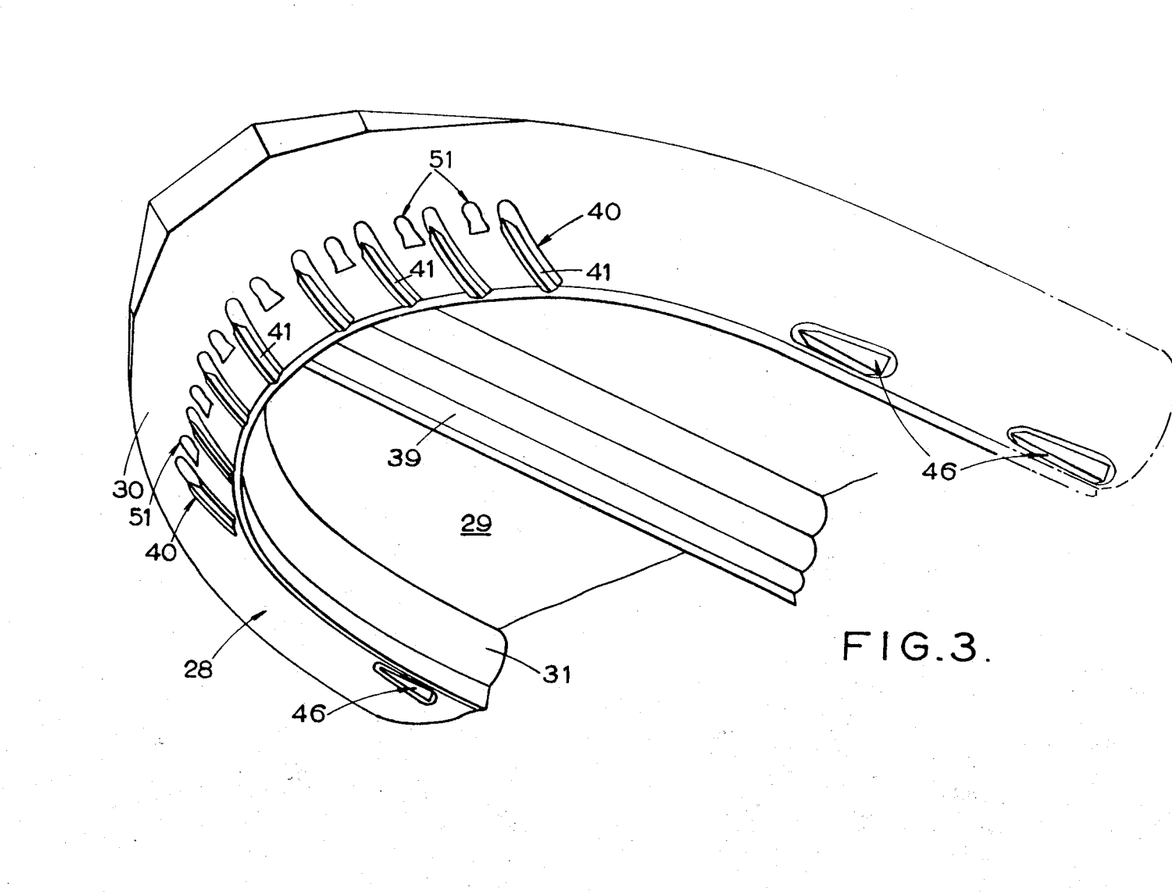
FIGURE 3 is a perspective under view of part of the bow of an air cushion vehicle according to the invention.

An inflatable keel 39 extends along the underside of the platform 29 and may be employed to provide a stability jet if desired.

Figure 4:
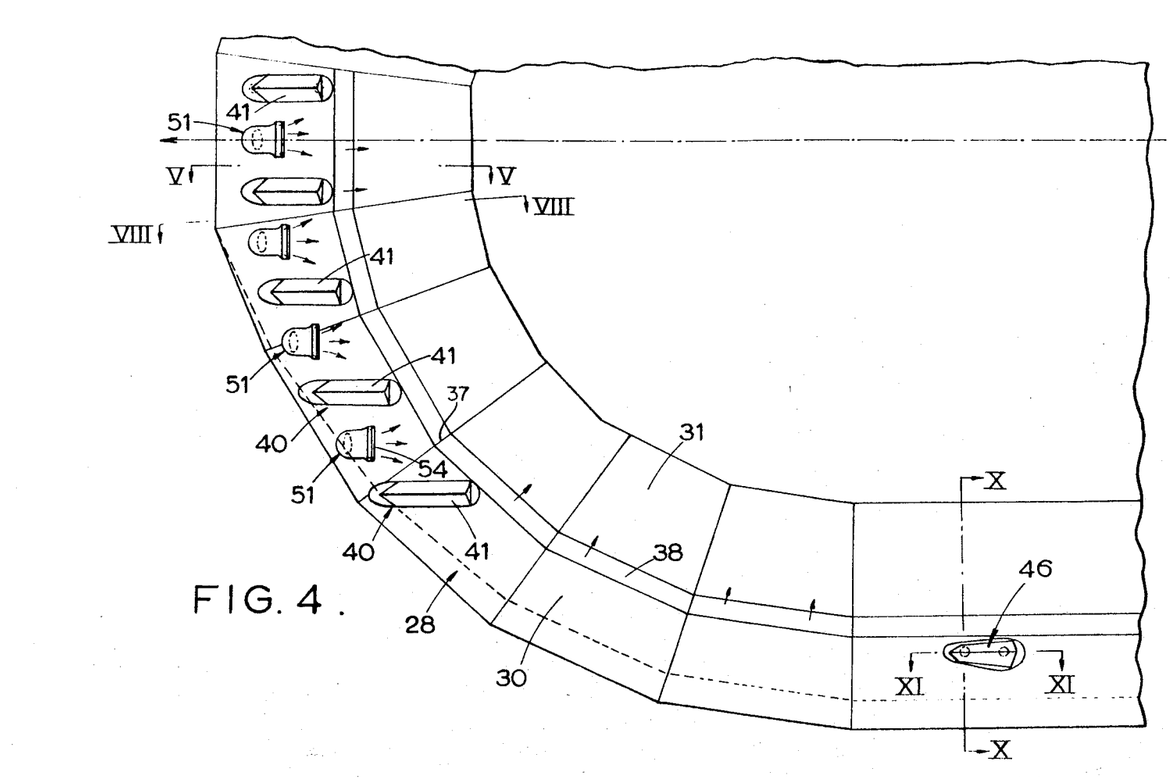
FIGURE 4 is a fragmentary under plan of part of the bow thereof, on a larger scale.

Around the bow 28 there are located eight projections 40 spaced equally, the most lateral of the projections 40 being located approximately in line with the inner flexible skirt 31 which extends along each side of the vehicle. Each projection 40 consists of a strip 41 of tough moulded rubber of V-shaped cross-section, mounted on an inflatable or inflated member 42. A suitable inflatable member 42 (see FIGURES 5 and 6) consists of a tube of semi-circular cross-section, secured to the outside surface of the outer flexible skirt 30 and closed at both ends, but served by two small feed-holes 43, 44 in the outer flexible skirt 30, one (43) near the upper end and the other (44) near the lower end of the inflatable member 42. The inflatable member 42 is located so that its lower end is coterminous at 35 with the outer flexible skirt 30, its upper end being about half-way up the skirt. The strip 41 extends over about the lower two-thirds of the inflatable member 42. When the skirting arrangement has been ballooned by the internal pressure, the projection 40 lies at an angle of about 40° to the horizontal, as shown in FIGURE 5, and is disposed parallel with the fore and aft axis of the craft, as shown in FIGURE 4.

Figure 5:
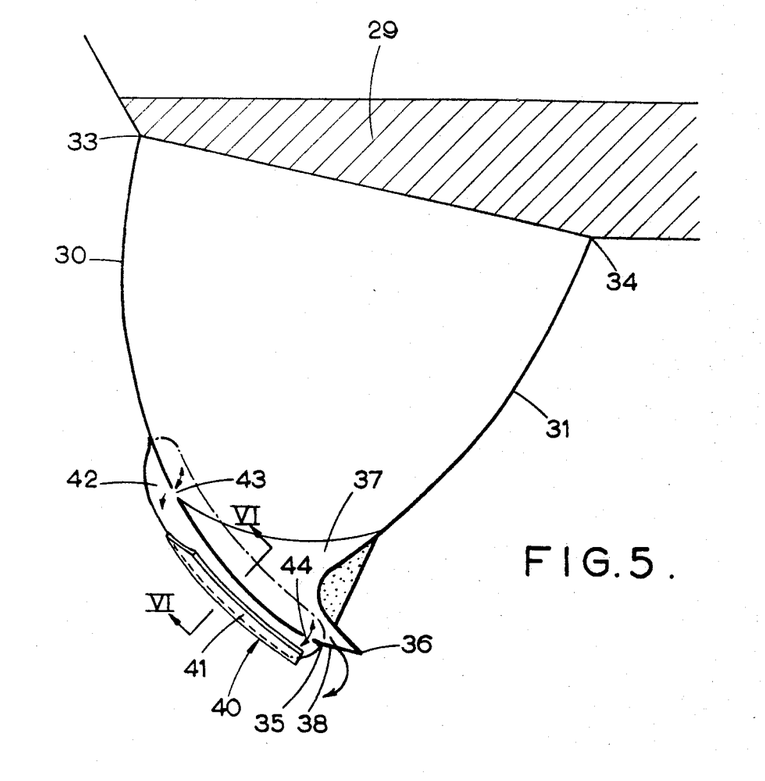
FIGURE 5 is a diagrammatic sectional elevation on the line V—V, FIGURE 4.
Figure 6:
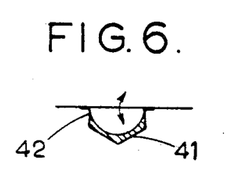
FIGURE 6 is a diagrammatic sectional elevation on the line VI—VI FIGURE 5.
Figure 7:
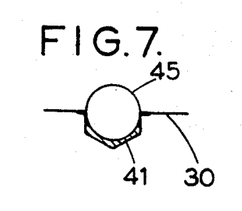
FIGURE 7 is a similar view for an alternative construction.
Figure 8:
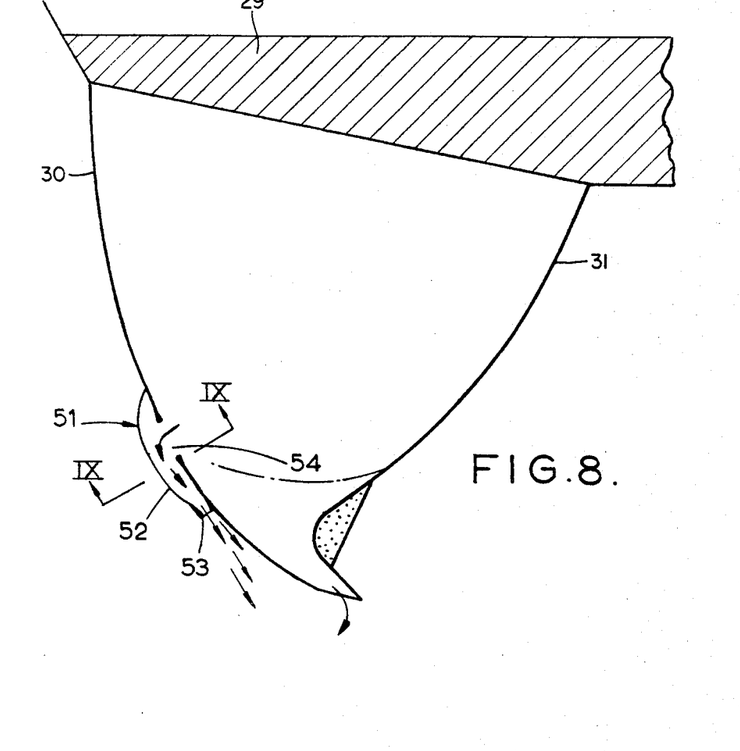
FIGURE 8 is a diagrammatic sectional elevation on the line VIII—VIII, FIGURE 4.
Figure 9:
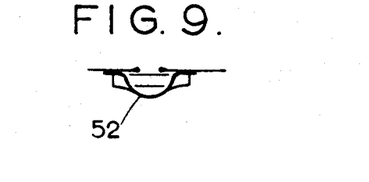
FIGURE 9 is a diagrammatic sectional elevation on the line IX—IX, FIGURE 8.

Instead of the strip 41 being mounted on an inflatable member 42, as just described, it may (see FIGURE 7) be mounted on a tube 45 closed at both ends and set in the material of the skirt 30 itself as indicated by the phantom lines in FIG. 5 and initially inflated to a pressure of 2–3 p.s.i., there being provided a valve (not shown) enabling inflation of the tube 45 independently of the air supply to the skirting arrangements.

Referring to FIGURES 3, 4, 10 and 11, projections 46 along the sides of the vehicle are also mounted on inflatable members 47 located along the lower edge of the outer flexible skirt 30 and also consist of tough rubber mouldings 48 of V-section arranged to extend just below the outer wall 30 of the skirt. Each inflatable member 47 has two small feed holes 49 to provide air from the skirting arranagement, and a small drain hole 50. Several such projections 46 will be required along the length of the side skirt, their number and disposition depending on the length of the side sections.

Referring to FIGURES 3, 4, 8 and 9, located around the bow 28 and between the projections are anti-suction spray suppression jets 51. These each consist of a tube 52 of semi-circular cross-section closed at its upper end and open at its lower end 53, and served by a feed-hole 54 in the outer flexible skirt 30.

In operation, the inflatable members 42 ensure that the projections 40 are below the forward of the lower edge 35 of the outer flexible skirt 30 (see FIGURE 5) and on contact with the water the projections 40 force the skirt upwards, preventing the occurrence of an immersion so deep as to permit suction to develop.

The projections 46 along the side of the craft similarly force the skirt upwards when they come in contact with water, so preventing the nozzles from entering the water and eliminating the high drag that would otherwise occur.

Figures 10, 11, 12:
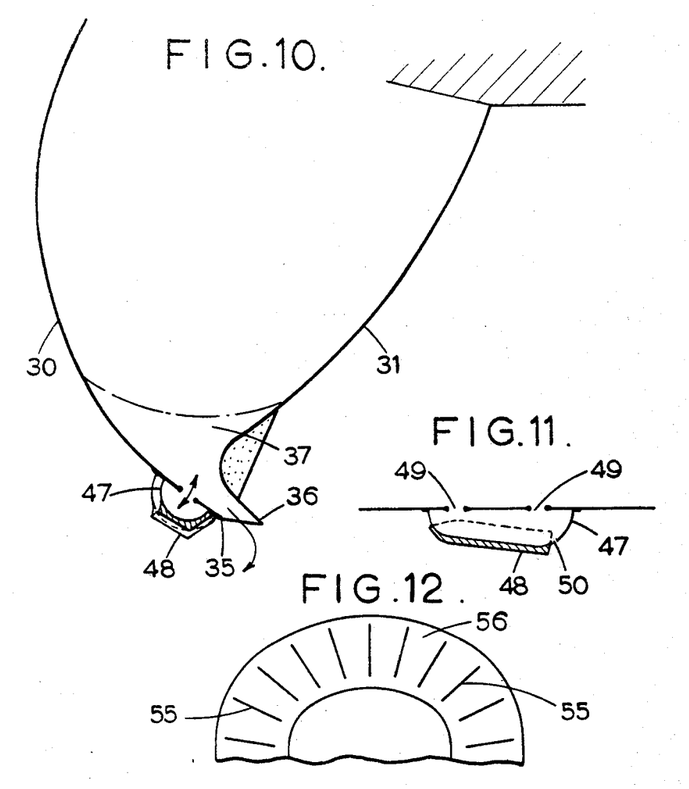
FIGURE 10 is a diagrammatic sectional elevation on the line X—X, FIGURE 4.
FIGURE 11 is a diagrammatic sectional elevation on the line XI—XI, FIGURE 4.
FIGURE 12 is a fragmentary diagrammatic under plan of the bow of another embodiment.
Figure 13:
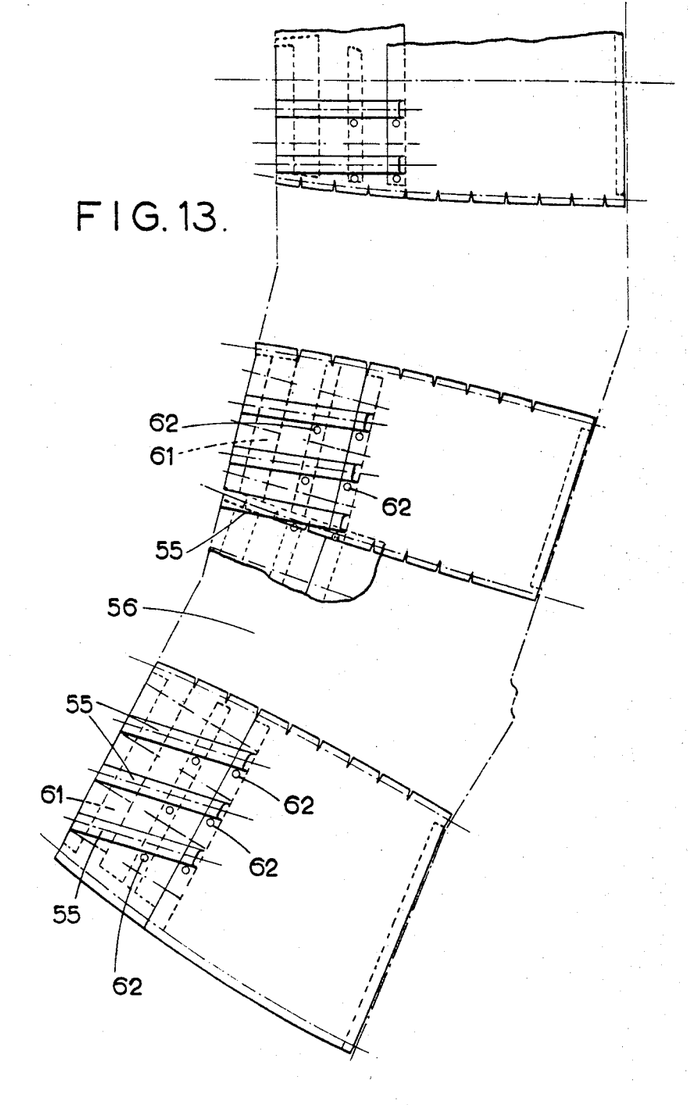
FIGURE 13 is a fragmentary developed under plan of part of the outer wall of the skirting arrangement of the embodiment of FIGURE 12.
Figure 14:
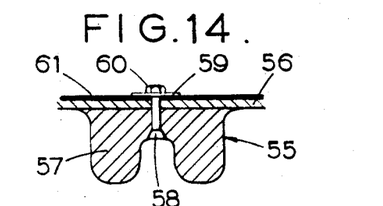
FIGURE 14 is a diagrammatic cross-sectional elevation through a rubbing strip.

Referring to FIGURES 12 to 14, in another embodiment the projections are in the form of rubbing strips 55 arranged radially, or substantially radially, around a bow section 56. Each rubbing strip is conveniently a strip of tough moulded rubber 57, of a cross-section as shown in FIGURE 14, secured by bolts 58, washers 59, and nuts 60. The disposition of the rubbing strips 55 is shown in greater detail in FIGURE 13. Reinforcing strips 61 are located around the skirt 56 between the washers 59 and the material of the skirt.

Between each pair of rubbing strips 55 there are a row of air holes 62, whereby air can be bled from the skirt. Issuing air is guided by the rubbing strips 55, and is directed downwardly. The combined effect of the rubbing strips 55 and the air lubrication provided by the air issuing from the air holes 62 is to prevent the water from adhering to the surface of the outer wall 56 of the skirt, thus reducing the suction or drag effect of the waters.

Figure 15:
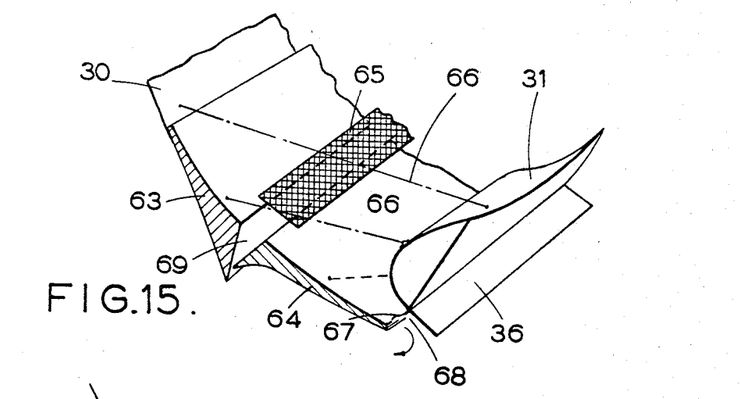
FIGURE 15 is a fragmentary perspective diagrammatic view of a hinging arrangement for the control of air holes or jets.

A disadvantage encountered when bleeding air from the skirt for the purpose of providing air lubrication is that when the skirt is out of contact with the water, valuable air is lost. This may be overcome by the provision of means arranged to control the flow of air in accordance with the position of the skirt relatively to the water. Such means are shown in FIGURES 15 to 17.

The lower part of the outer skirt wall 30 is formed with two strips 63, 64 hingedly connected by a strip 65 of net. Instead of diaphragms, the walls 30, 31 of the skirting arrangement are maintained at their correct distance apart by tie chains 66. A further tie chain 67 is arranged to maintain the lower end of the strip 64 relatively to the lower edge 36 of the inner skirt wall 31. By this means there are provided a jet 68 and an auxiliary air jet 69.

Figure 16:
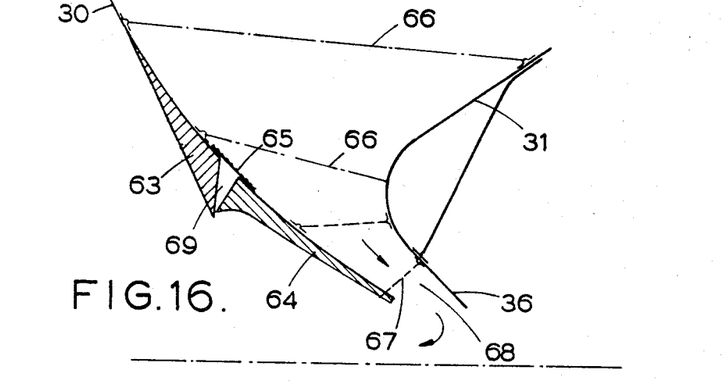
FIGURE 16 is a diagrammatic sectional elevation of the arrangement showing a normal jet in the open position.
Figure 17:
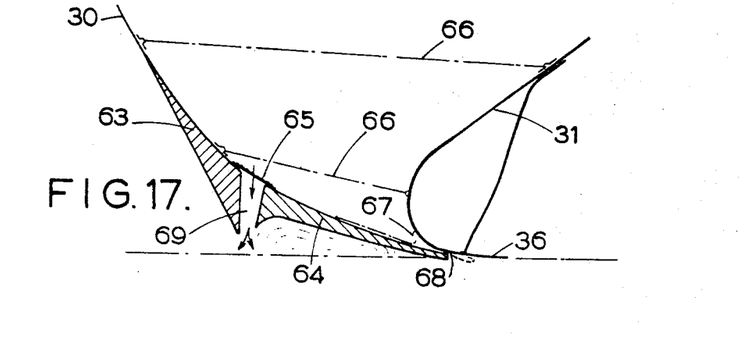
FIGURE 17 is a similar view of the arrangement showing the jets in the closed position.

During normal movement of the vehicle over water, but with the skirt out of contact with the water, the strip 64, as will be seen from FIGURE 16, is maintained by the pressure in the skirt and by the tie chain 67 so as to effect the formation of the normal jet 68. When the skirt comes into contact with the water, as will be seen from FIGURE 17, the strip 64 and the lower edge 36 of the inner skirt wall 31 are forced upwardly, and the tie chain 67 collapses. The hinging of the strip 64 about its net hinge 65 causes closing of the jet 68 and the opening of the auxiliary air jet 69, which then fulfils the role of an air lubrication hole or spray suppression jet.

Figure 18:
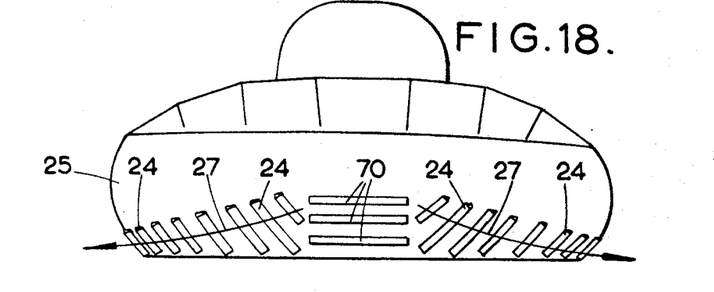
FIGURE 18 is a diagrammatic front elevation of the embodiment of air cushion vehicle illustrated in FIGURE 2.

Referring to FIGURES 2 and 18, there is shown another embodiment of air cushion vehicle provided with flow breaker strips. The bow portion 25 of the vehicle has at the foremost central position horizontal strips 70, flanked by arrays of strips 24 inclined upwardly and outwardly. The strips 24 and 70 are wedge-shaped in cross-section, and may vary in length and disposition according to the characteristics of the vehicle. Those illustrated are solid, but they may be inflatable, or they may be moulded integrally with the skirt wall. The strips may alternatively be formed of wood or metal, and may be combined with wheels or rollers. In overland operation, they may thus serve the useful purpose of absorbing the extreme wear sometimes experienced over local areas of the skirt, and for this purpose they may be arranged to be readily replaceable when worn.

The flow breaker strips 24, 70 tend to break up the flow of water and prevent the water from adhering to the surface of the outer wall of the skirt, and thus reduce the suction or drag effect of the water.

Figure 19:
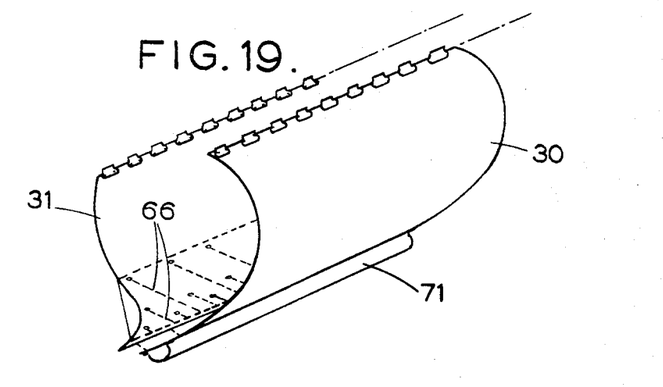
FIGURE 19 is a diagrammatic fragmentary perspective view of one form of hollow flow breaker strip.
Figures 20, 21, 22:
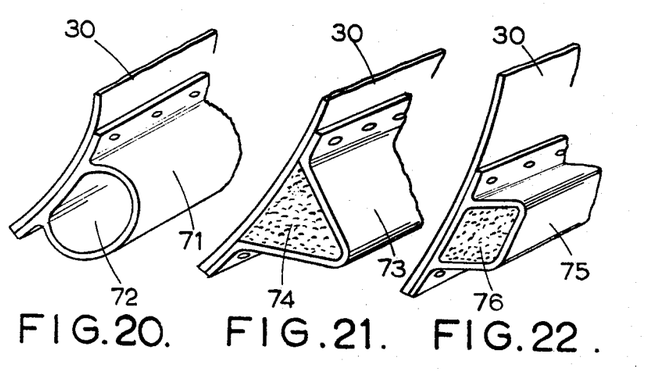

Other embodiments of water-deflecting strips are shown in FIGURES 19 to 22. Referring to FIGURES 19 and 20, in a skirting arrangement having outer and inner walls 30, 31 respectively, maintained in spaced relation by the skirt air pressure and by tie chains 66, there is provided along the lower edge of the outer wall 30 a hollow beading 71, having an air-filled interior 72.

In operation, when a portion of the flexible skirting arrangement contacts a penetratable surface, the hollow beading 71 will oppose the tendency of that part of the flexible skirting arrangement to plough into the penetratable surface and will aid the lower portion of that part of the flexible skirting arrangement to float on or ride over the surface.

The beading may have other shapes and may be filled with suitable material. Thus, FIGURE 21 shows a beading 73 of triangular cross-section and filled with cork blocks 74; FIGURE 22 shows a beading 75 of rhomboid cross-section and filled with polyurethane foam 76. Any means that is buoyant in water and will present a suitable beading surface to a penetratable surface, so that the lower edge of the skirt will not plough into the penetratable surface, may be employed.

It is to be understood that in any of the embodiments hereinbefore described, the water deflecting strips may be mounted on an inflatable member if so desired.

We claim as our invention:

1. An air cushion vehicle comprising a base structure, flexible skirt means depending from said base structure to define, at least in part, a pressurized supporting cushion, means generating and maintaining said pressurized supporting cushion, air emitting means carried by said skirt means to permit streams of air to issue outwardly of said skirt means, and water-deflecting strips carried by said skirt means, at least some of the streams of air passing between adjacent strips to act as air lubrication and prevent water from adhering to the surface of the skirt means.

2. A vehicle as claimed in claim 1, wherein said strips are arranged to serve as guides for streams of air passing from said air emitting means.

3. A vehicle as claimed in claim 1, wherein at least some of said air emitting means comprise jets carried by said skirt means for directing streams of air toward the lower edge of said skirt means.

4. A vehicle as claimed in claim 3, wherein said skirt means comprises a double-walled inflatable skirting assembling, and said jets are supplied with air under pressure from the interior of the inflatable assembly.

5. A vehicle as claimed in claim 3, wherein each jet is disposed between two water-deflecting strips.

6. A vehicle as claimed in claim 5, wherein each jet is disposed to direct air in a direction substantially parallel to the adjacent water-deflecting strips.

7. A vehicle as claimed in claim 1, wherein at least some of said air emitting means comprise holes formed in said flexible skirt means.

8. A vehicle as claimed in claim 1, wherein at least some of said strips comprise planing devices located around the bow of the vehicle and inclined forwardly and upwardly at an angle of about 40° to the horizontal.

9. A vehicle as claimed in claim 1, wherein at least some of said strips are of substantially V-shaped cross-section.

10. A vehicle as claimed in claim 1, wherein at least some of said strips comprise, at least in part, inflatable members.

References Cited

UNITED STATES PATENTS

| | | | |
|---|---|---|---|
| 3,040,687 | 6/1962 | Huet | 114—56 |
| 3,291,237 | 12/1966 | Hopkins et al. | 180—7 |
| 3,205,847 | 9/1965 | Smith | 114—67 |
| 3,244,244 | 4/1966 | Cockerell | 180—128 |

A. HARRY LEVY, *Primary Examiner.*